US012577829B2

(12) United States Patent
Nissinen et al.

(10) Patent No.: US 12,577,829 B2
(45) Date of Patent: Mar. 17, 2026

(54) BUILDING STRUCTURE WINDOW WITH OPTICALLY TRANSPARENT AND SELF-COOLING COATINGS

(71) Applicant: Nano and Advanced Materials Institute Limited, Hong Kong (HK)

(72) Inventors: Tomi Pekka Bernhard Nissinen, Tampere (FI); Hau To Wong, Hong Kong (HK); Heung Kiu Cheng, Hong Kong (HK); Qijia Fu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 910 days.

(21) Appl. No.: 17/848,380

(22) Filed: Jun. 23, 2022

(65) Prior Publication Data

US 2023/0018287 A1 Jan. 19, 2023

Related U.S. Application Data

(60) Provisional application No. 63/219,362, filed on Jul. 8, 2021.

(51) Int. Cl.
*A01G 9/14* (2006.01)
*B05D 1/12* (2006.01)
(Continued)

(52) U.S. Cl.
CPC .................. *E06B 9/24* (2013.01); *A01G 9/14* (2013.01); *B05D 1/12* (2013.01); *B05D 7/02* (2013.01);
(Continued)

(58) Field of Classification Search
CPC .......... A01G 9/14; B05D 7/56; C09D 175/04; C09D 5/32; C09D 7/61; E06B 2009/2417; E06B 9/24; B32B 2255/20; B32B 2255/28
See application file for complete search history.

(56) References Cited

U.S. PATENT DOCUMENTS 5,405,680 A 4/1995 Chang et al.
9,517,970 B2 12/2016 Tixhon et al.
(Continued)

FOREIGN PATENT DOCUMENTS

CN 101910884 A 12/2010
CN 105682451 A 6/2016
(Continued)

OTHER PUBLICATIONS

1st Office Action of the corresponding China patent application No. 202210722423.9 mailed on Dec. 28, 2024.

*Primary Examiner* — Joanna Pleszczynska
(74) *Attorney, Agent, or Firm* — IDEA Intellectual Limited; Sam T. Yip

(57) ABSTRACT

The invention relates to a window for a building structure containing optically transparent and self-cooling coatings on a substrate. The optically transparent and self-cooling coatings has a multi-layered structure including a passive cooling layer, a near-infrared radiation absorption layer and a near-infrared radiation reflecting layer. The optically transparent and self-cooling coatings have a visible light transmittance of more than approximately 70%. In addition, an air temperature under the window under ventilation condition is reduced by at least approximately 2° C., and an air temperature under the window under insulated condition is reduced by at least approximately 8° C.

11 Claims, 17 Drawing Sheets

(51) Int. Cl.

| | |
|---|---|
| *B05D 7/00* | (2006.01) |
| *B05D 7/02* | (2006.01) |
| *C09D 5/32* | (2006.01) |
| *C09D 7/40* | (2018.01) |
| *C09D 7/45* | (2018.01) |
| *C09D 7/61* | (2018.01) |
| *C09D 7/65* | (2018.01) |
| *C09D 175/04* | (2006.01) |
| *E06B 9/24* | (2006.01) |

(52) U.S. Cl.
CPC ................. *B05D 7/54* (2013.01); *C09D 5/32* (2013.01); *C09D 7/45* (2018.01); *C09D 7/61* (2018.01); *C09D 7/65* (2018.01); *C09D 7/69* (2018.01); *C09D 175/04* (2013.01); *E06B 2009/2417* (2013.01)

(56)   References Cited

U.S. PATENT DOCUMENTS

| | | | |
|---|---|---|---|
| 10,015,933 | B2 | 7/2018 | Boldrin |
| 2014/0355107 | A1 | 12/2014 | Taima |
| 2017/0363789 | A1 | 12/2017 | Stalder et al. |
| 2019/0161361 | A1* | 5/2019 | Tsunematsu ............. C09D 5/32 |

FOREIGN PATENT DOCUMENTS

| | | |
|---|---|---|
| CN | 103539365 B | 8/2016 |
| CN | 110157079 A | 8/2019 |
| CN | 111550157 A | 8/2020 |
| CN | 112175458 A | 1/2021 |
| WO | 2015052319 A1 | 4/2015 |

* cited by examiner

3rd layer – Formula H
2nd layer – Formula G
1st layer – Formula F
PE film

FIG. 7A

2nd layer – Formula G
1st layer – Formula F
PE film

BUILDING STRUCTURE WINDOW WITH OPTICALLY TRANSPARENT AND SELF-COOLING COATINGS

CROSS-REFERENCE TO RELATED APPLICATION

The present application claims domestic priority from provisional U.S. Patent Application 63/219,362 filed 8 Jul. 2021 the disclosure of which is incorporated by reference herein.

COPYRIGHT NOTICE

FIELD OF THE INVENTION

The present invention generally relates to high-transparency and self-cooling building structure window films or coatings.

BACKGROUND OF THE INVENTION

A greenhouse is a structure with transparent walls and roof. The greenhouse is useful against typhoons, acid rain and insect pests, as well as in lowering temperature in summer time and keeping temperature high enough in winter time. Because a greenhouse can provide plants or crops with suitable environment to grow, it is often used to cultivate plants or crops of high economic value.

The walls and roof of the greenhouse determine the light spectrum and in turn the light energy entering the space inside the greenhouse. This will then determine the air temperature inside the greenhouse. Although solar radiation is able to heat the air inside the greenhouse and maintain the crops in a warm environment in winter, this same solar radiation may lead to over-heating when it is summer or if the greenhouse is located close to the equator. Under such circumstances, the temperature inside the greenhouse can rise to above 50° C., which is not favorable to the vegetation and becomes non-productive. The productivity of the greenhouse can be improved by allowing the portion of solar radiation spectrum with productive visible light, but rejecting the non-productive infrared spectrum.

Therefore, in view of the shortcomings of the existing greenhouse, there is a need to provide a coating system that can be set up on the walls and roofs of greenhouses to reduce the amount of non-productive solar radiation spectrum entering the greenhouse. However, the coating system must remain transparent to productive visible light to a certain extent.

SUMMARY OF THE INVENTION

Accordingly, a first aspect of the present invention provides a building structure window containing optically transparent and self-cooling coatings on a window substrate. The optically transparent and self-cooling coatings include a multi-layered structure including a passive cooling layer and a near-infrared radiation absorption layer. Optionally, a near-infrared radiation reflecting layer may be included. The optically transparent and self-cooling coatings have a visible light transmittance of more than approximately 70%. In addition, an air temperature under the window under ventilation condition is reduced by at least approximately 2° C., and an air temperature under the window under insulated condition is reduced by at least approximately 8° C.

In accordance with one embodiment, the passive cooling layer includes the following formulation: approximately 20-45 wt % of metal oxide, approximately 3.0-55 wt % of binder, approximately 1.0-5.0 wt % of dispersing agent, approximately 5.0-10 wt % of wetting agent and approximately 10-50 wt % of water.

In accordance to one embodiment, the metal oxide includes silicon oxide, silicon nitride, silicon carbide or materials with IR emissivity property at 8-13 µm.

In accordance with one embodiment, a particle size of the silica sphere is in a range of approximately 7-9 µm, and a particle size of the antimony doped tin oxide is in a range of approximately 20-400 nm.

In accordance with one embodiment, the dispersing agent is a low molecular weight dispersant selected from hexametaphosphate, triphosphate, pyrophosphate, citrate, tartrate and succinate with ammonium cations, group 1A or group 2A metallic cations.

In accordance with one embodiment, the near-infrared radiation absorption layer includes the following formulation: approximately 40-50 wt % of metal oxide, approximately 20-40 wt % of binder, approximately 0.5-3.0 wt % of dispersing agent, approximately 7.0-15 wt % of wetting agent and approximately 5-15 wt % of water.

In accordance with one embodiment, the dispersing agent is a low molecular weight dispersant selected from hexametaphosphate, triphosphate, pyrophosphate, citrate, tartrate and succinate with ammonium cations, group 1A or group 2A metallic cations.

In accordance with one embodiment, the near-infrared radiation reflecting layer includes the following formulation: approximately 1.0-5.0 wt % of binder, approximately 20-40 wt % of metal oxide, approximately 2.0-7.0 wt % of wetting agent and approximately 50-70 wt % of water.

In accordance with one embodiment, the metal oxide includes zinc oxide, aluminum oxide, or other transition metal oxides, post-transition metal oxides, metalloids oxides with near infrared absorption property and having high transparency at visible light region.

A second aspect of the present invention provides a window containing a near-infrared radiation reflecting, absorbing and self-cooling single layer on a window substrate. The layer reduces an average transmittance of near-infrared radiation and mid wavelength infrared radiation of the window to approximately 60% and 25% respectively, and an air temperature under the window under ventilation condition is reduced by at least approximately 4° C. to 5° C.

In accordance with one embodiment, the near-infrared radiation reflecting, absorbing and self-cooling single layer includes the following formulation: approximately 10-20 wt % of at least one titanium oxide particle deposited on one or more macro-particles, approximately 1-10 wt % of binder, approximately 5-15 wt % of wetting agent and approximately 65-75 wt % of water.

In accordance with one embodiment, the one or more macro-particles includes fly ash, glass bead, hollow glass microspheres, polyethylene terephthalate, or macroparticles with a particle size ranging from 1-10 µm, or a combination thereof.

In accordance with one embodiment, the at least one titanium oxide particle is deposited on the surface of the one or more macro-particles through spraying.

In accordance with one embodiment, a particle size of the at least one titanium oxide particle is a nanoscale particle.

In accordance with one embodiment, the substrate comprises glass, polyolefins, polyethylene film, polycarbonate, poly(methyl methacrylate), and polyvinyl chloride.

Furthermore, the present invention provides a greenhouse including any of the aforementioned windows.

The present invention provides some chemical formulations of window films or coatings, which provide advanced thermal and sunlight management of building materials for greenhouse. These window films and coatings have the following advantages: (1) high rejection of infrared light from the sunlight; (2) radiative passive cooling; (3) locally heated coating; (4) high transparency of visible light; (5) improved thermal efficiency inside the greenhouse; and (6) scattering effect and internal reflection.

BRIEF DESCRIPTION OF THE DRAWINGS

Embodiments of the present invention are described in more detail hereinafter with reference to the drawings, in which:

FIG. 7A depicts a schematic diagram of a composite PE film with a passive cooling coating;

FIG. 7B depicts a schematic diagram of a composite PE film without a passive cooling coating;

4

Figure 16:
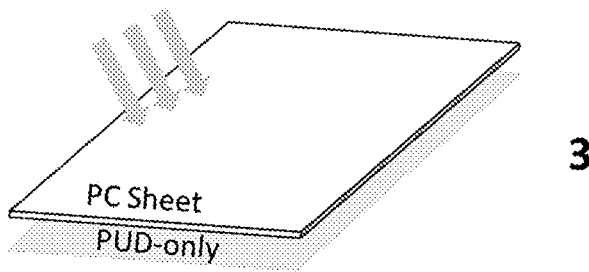
Figure 16:
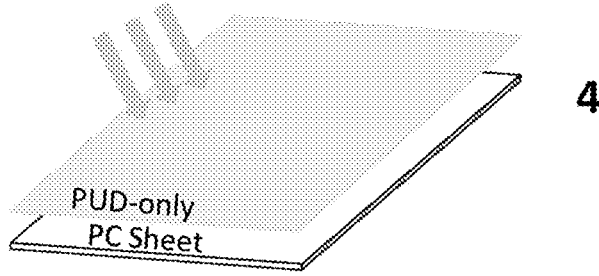
Figure 17:
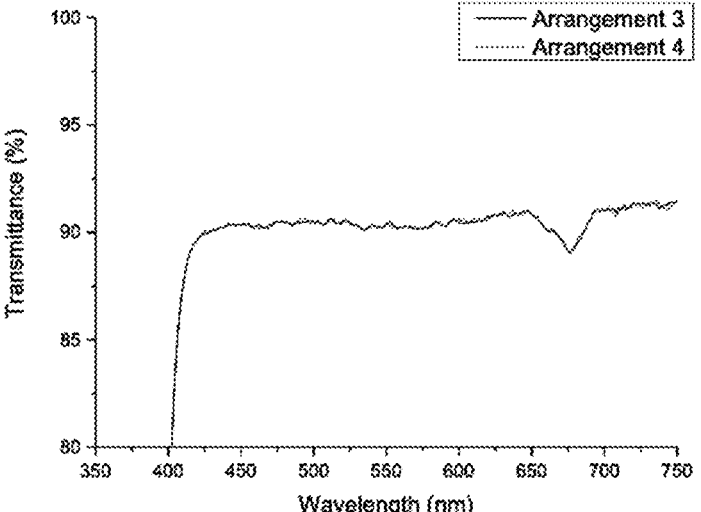

FIG. 16 depicts two different arrangements between the PUD coating and the substrate; and FIG. 17 illustrates the transmittance of visible light through the two different arrangements shown in FIG. 16.

DETAILED DESCRIPTION

The present invention will be described in detail through the following embodiments with appending drawings. It should be understood that the specific embodiments are provided for an illustrative purpose only, and should not be interpreted in a limiting manner. Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features. Other aspects and advantages of the invention will be apparent to those skilled in the art from a review of the ensuing description.

Figure 1:
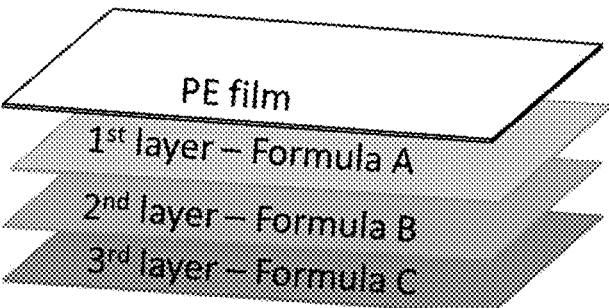
FIG. 1 depicts a schematic diagram of coatings on a composite PE film.

In order to reduce the amount of non-productive light spectrum entering a greenhouse, the present invention provides a window containing optically transparent and self-cooling coatings on a window substrate. As shown in FIG. 1, the optically transparent and self-cooling coatings have a multi-layered structure including a passive cooling layer with Formulation A, a near-infrared radiation absorption layer with Formulation B and, optionally, a near-infrared radiation reflecting layer with Formulation C. In some embodiments, the window material itself has radiation-reflecting properties; in these embodiments in particular, a near-infrared radiation reflecting layer is not required.

In one embodiment, all of the passive cooling layer, near-infrared radiation absorption layer and near-infrared radiation reflecting layer include at least one metal oxide. The at least one metal oxide is/are able to absorb infrared radiation, reflect infrared radiation, as well as emission of long wavelength infrared.

In another embodiment, the passive cooling layer is formulated by at least one metal oxide, a binder, a dispersing agent, a wetting agent and water. The near-infrared radiation absorption layer is formulated by at least two kinds of metal oxide (at least one is for infrared absorption; and at least one is for infrared emission), a binder, a dispersing agent, a wetting agent and water. The near-infrared radiation reflecting layer is formulated by a binder, at least one metal oxide, a wetting agent and water. For example, the composition of Formulation A, Formulation B and Formulation C are listed in Table 1, Table 2 and Table 3, respectively.

TABLE 1

| Composition of Formulation A | |
| --- | --- |
| Components | Percentage (weight %) |
| Water | 42.09% |
| Silica spheres | 42.09% |
| Sodium hexametaphosphate | 2.80% |
| PUD-1591 | 3.26% |
| J1703 | 9.77% |

In Table 1, silica spheres serve as a metal oxide; sodium hexametaphosphate serves as a dispersing agent; PUD-1591 serves as a binder; and J1703 is a wetting agent, a mixture of benzyl-polyethylene glycol (1,1,3,3-tetramethylbutylphenyl) ether, polyethylene glycol octylphenyl ether and poly (ethylene oxide). In addition to the silica sphere, other materials with IR emissivity property at 8-13 μm can also be used in the present invention, including but not limited to silicon nitride, silicon carbide, etc. The silica spheres may be present in a wide range of sizes from approximately 1 micron to approximately 15 microns. In some embodiments, a narrower range of sizes may be used; for example, 7 to 9 microns may be used.

The dispersing agent used in the present invention is a low molecular weight dispersant. In addition to sodium hexametaphosphate, other low molecular weight dispersing agents can also be used in the present invention, such as hexametaphosphate, triphosphate, pyrophosphate, citrate, tartrate and succiate with ammonium cations, group 1A or group 2A metallic cations (e.g., sodium ions, magnesium ions, potassium ions, calcium ions, etc.).

TABLE 2

Composition of Formulation B

| Components | Percentage (weight %) |
|---|---|
| Water | 10.52% |
| Silica spheres | 10.52% |
| Sodium hexametaphosphate | 0.70% |
| PUD-1591 | 34.74% |
| J1703 | 9.59% |
| ATO-WP030 (antimony tin oxide) | 33.93% |

In Table 2, silica spheres serves as a metal oxide; sodium hexametaphosphate serves as a dispersing agent; polyurethane dispersion-1591 (PUD-1591) serves as a binder; J1703 serves as a wetting agent, ATO-WP030 serves as a metal oxide with infrared absorption property and silica sphere serves as another metal oxide with infrared emissivity property at 8-13 μm. Since the near-infrared radiation absorption layer would become heat sink upon exposure to sunlight, silica may be used to cool this layer by its IR emissive property. Together with the passive cooling layer, the temperature can be lowered to a greater extent.

In addition to the antimony tin oxide, other metal oxides can also be used in the present invention, such as indium tin oxide, transition metal oxides, post-transition metal oxides, metalloids oxides having near infrared absorption property and high transparency at visible light region. In addition to the silica spheres, other materials with an IR emissivity property at 8-13 μm can also be used in the present invention, including but not limit to silicon nitride, silicon carbide.

The dispersing agent used in the present invention is a low molecular weight dispersant. In addition to sodium hexametaphosphate, other low molecular weight dispersing agents can also be used in the present invention, such as hexametaphosphate, triphosphate, pyrophosphate, citrate, tartrate and succiate with ammonium cations, group 1A or group 2A metallic cations (e.g., sodium ions, magnesium ions, potassium ions, calcium ions, etc.).

TABLE 3

Composition of Formulation C

| Components | Percentage (weight %) |
|---|---|
| Water | 60.00% |
| PUD-1591 | 3.53% |

TABLE 3-continued

Composition of Formulation C

| Components | Percentage (weight %) |
|---|---|
| TIO-WPR010 | 31.76% |
| J1703 | 4.71% |

In Table 3, PUD-1591 serves as a binder; TIO-WPR010 serves as a metal oxide; and J1703 serves as a wetting agent. In addition to the TIO-WPR010, other metal oxides can also be used in the present invention, such as zinc oxide, aluminum oxide or other transition metal oxides, post-transition metal oxides, metalloids oxides with near infrared reflection property and having high transparency at visible light region.

The traditional method for coating on transparent substrates is through sputtering, but it is costly and has a limit to substrate size. In contrast, the formulations of the present invention allow the coatings to be applied by spraying, which is relatively more economical, especially when extremely large film is used. In particular, the films of the present invention may be formed in large areas of approximately at least 1 square meter, at least 2 square meters, or more. The coatings may have a thickness variation of approximately plus or minus 10-20 percent from a median (e.g., "design") thickness. Such a thickness level is sufficient to minimize visual distortion in the window; that is, a highly uniform thickness is not always required for applications such as greenhouse windows where viewing the external environment by the user is not the primary goal. By having flexibility concerning thickness variation from a median "design thickness" a large scale, economically feasible coating may be formed. Typical median thickness of each layer is 10-20 μm.

In one embodiment, the substrate window includes a glass or a polymer film, such as polyethylene (PE), polyolefins, polycarbonate, poly(methyl methacrylate) and polyvinyl chloride film. The targeted substrate of these coatings is commonly used as the wall material of greenhouse. For example, a composite PE film is able to reduce the temperature under the film by 2° C. to 8° C., depending on the ventilation conditions under the film. This allows the air temperature under the film to be at a controlled range, which is suitable for the growth of plants.

Figure 2A:
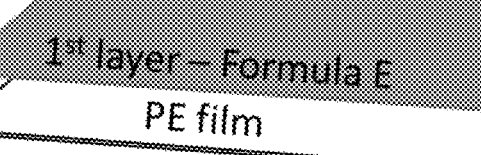
FIG. 2A depicts a schematic diagram of a composite PE film with a single-layer coating.
Figure 2B:
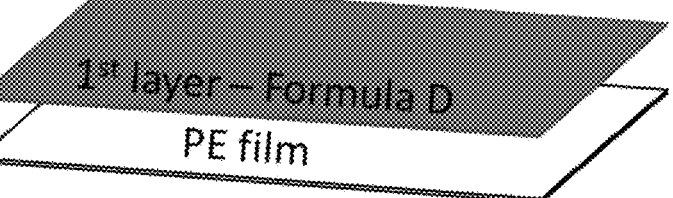
FIG. 2B depicts a schematic diagram of another composite PE film with metal oxide suspended in polymer matrix.

In another aspect, the instant disclosure provides a window containing a near-infrared radiation reflecting, absorbing and self-cooling single layer on a substrate. As shown in FIG. 2A, the near-infrared radiation reflecting, absorbing and self-cooling single layer has Formulation E. For the control group, FIG. 2B shows another composite PE film with metal oxide suspended in polymer matrix, which has Formulation D.

In one embodiment, the near-infrared radiation reflecting, absorbing and self-cooling single layer is formulated by at least one titanium oxide particle deposited on one or more macro-particles, a binder, a wetting agent and water. For example, the composition of control group-Formulation D is listed in Table 4, and the composition of Formulation E is listed in Table 5.

7 8

TABLE 4

| Composition of Formulation D | |
| --- | --- |
| Components | Percentage (weight %) |
| PUD-1591 | 1.78% |
| TIO-WPR010 | 88.76% |
| J1703 | 9.47% |

TABLE 5

| Composition of Formulation E | |
| --- | --- |
| Components | Percentage (weight %) |
| PUD-1591 | 3.37% |
| Water | 70.79% |
| Titanium oxide deposited on Fly Ash | 16.85% |
| J1703 | 8.99% |

In Table 4 and Table 5, PUD-1591 serves as a binder; J1703 serves as a wetting agent; and TIO-WPR010 serves as a metal oxide.

Apart from randomly suspending metal oxide particles in the matrix of binder, depositing metal oxide on the surface of macro-particle is a key component in this invention. This technique greatly improves the reflectivity of infrared light from the sun by more than 20% in comparison with random suspension in the binder matrix.

In one embodiment, the at least one titanium oxide particle is deposited on the surface of the one or more macro-particles through spraying. The one or more macro-particles may include, but are not limited to, fly ash, glass beads, hollow glass microspheres, polyethylene terephthalate, or macroparticles with a particle size ranging from 1-10 μm.

The following examples illustrate the present invention and are not intended to limit the same.

EXAMPLES

Example 1

Figure 3:
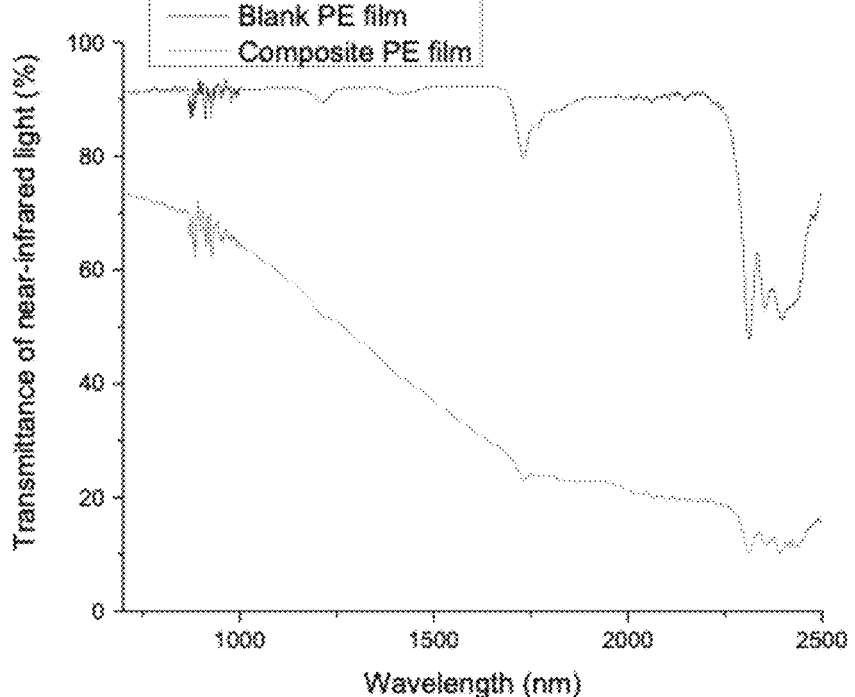
FIG. 3 illustrates the transmittance of near-infrared light through the composite PE film with or without coatings.

Compared to a PE film without any coating, FIG. 3 shows that a composite PE film including a passive cooling layer with Formulation A, a near-infrared radiation absorption layer with Formulation B and a near-infrared radiation reflecting layer with Formulation C is able to significantly reduce the amount of near-infrared light (700-2,500 nm) transmitting through the composite PE film.

In average, 86% of near-infrared light can pass through the PE film without coating, but only 25% of near-infrared light passes through the composite PE film in the present invention. The rejection of near-infrared light by the coatings is higher than 60%.

Example 2

Figure 4:
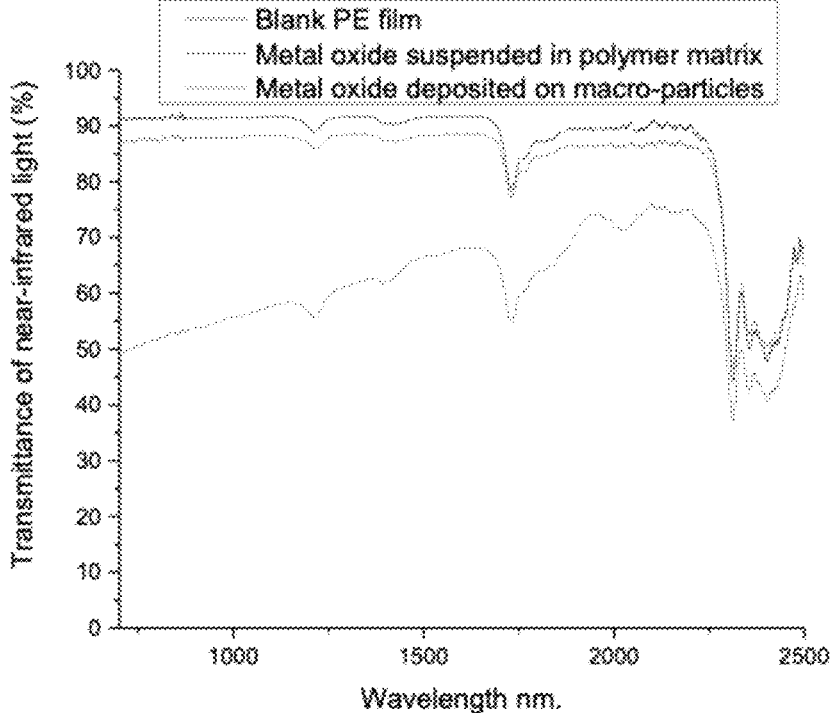
FIG. 4 illustrates the transmittance of near-infrared light through the blank PE film, the PE film with metal oxide suspended in polymer matrix, or the PE film with metal oxide deposited on macro-particles.

FIG. 4 shows the transmittance of near-infrared light through a single-layer coating on PE film. The results showed that the rejection of near-infrared light could be enhanced by depositing the metal oxide on macro-particles (prepared by Formulation E). In contrast, the average transmittance is around 83% when the metal oxide is randomly suspended in the polymer matrix (prepared by Formulation D), but the transmittance is significantly reduced by more than 20% down to 61%.

Example 3

Figure 5:
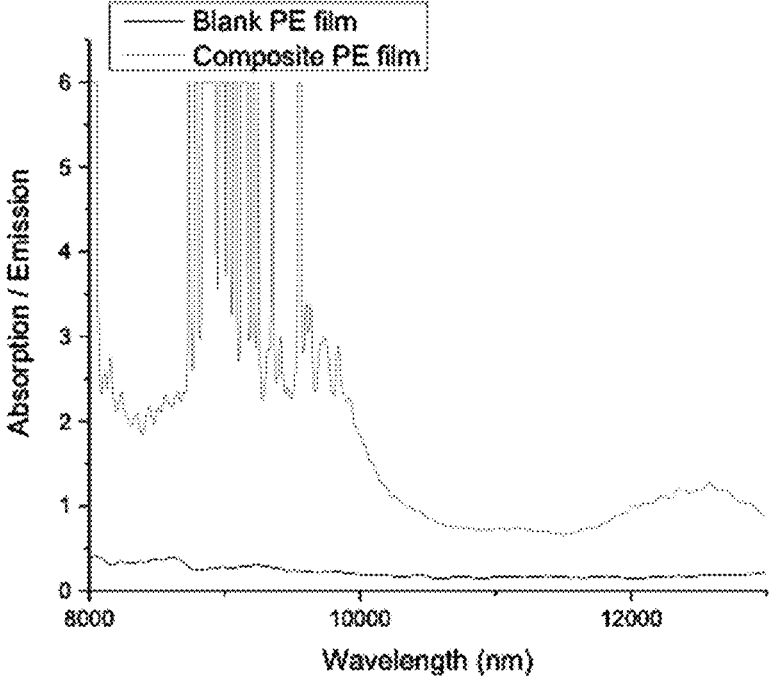
FIG. 5 illustrates the emission of the composite PE film obtained from FIG. 1 at different wavelengths.

Referring to FIG. 5, it shows that the coatings prepared by Formulation A, B and C have strong emission of long wavelength infrared light (7,000 nm-14,000 nm), which is so-called sky-window. Only small amount of the emitted light within that range is absorbed by the atmosphere. Most of it leaves the atmosphere and enters the space. However, the blank PE film does not show emission in this range of wavelength. This means that the coatings are able to cool down the greenhouse by radiation without external energy supply to cooling system.

Example 4

Figure 6:
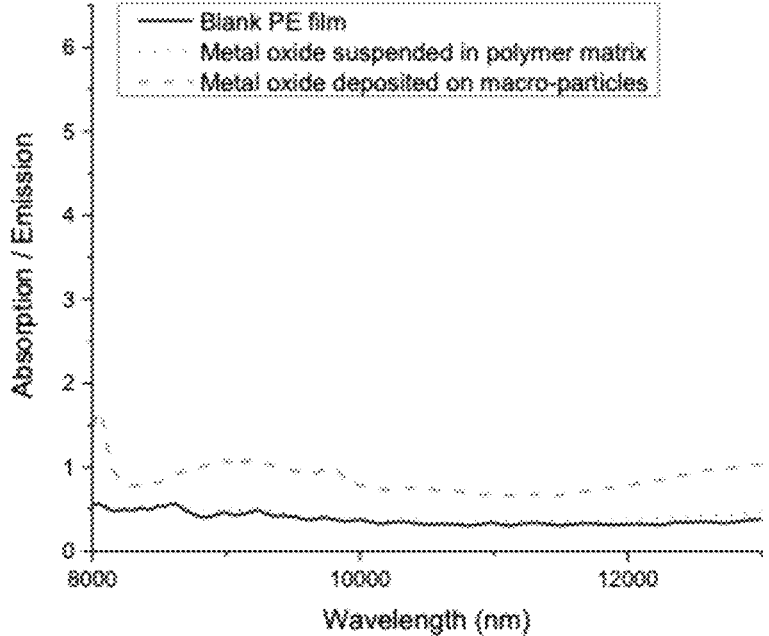
FIG. 6 illustrates the emission of the composite PE film obtained from FIG. 2A and FIG. 2B at different wavelengths.

Referring to FIG. 6, the coating with metal oxide deposited on macro-particle prepared by Formulation E showed the function of radiative passive cooling, while the coating with metal oxide suspended in polymer matrix prepared by Formulation D did not observably show such function.

Example 5

Figures 7A, 7B:
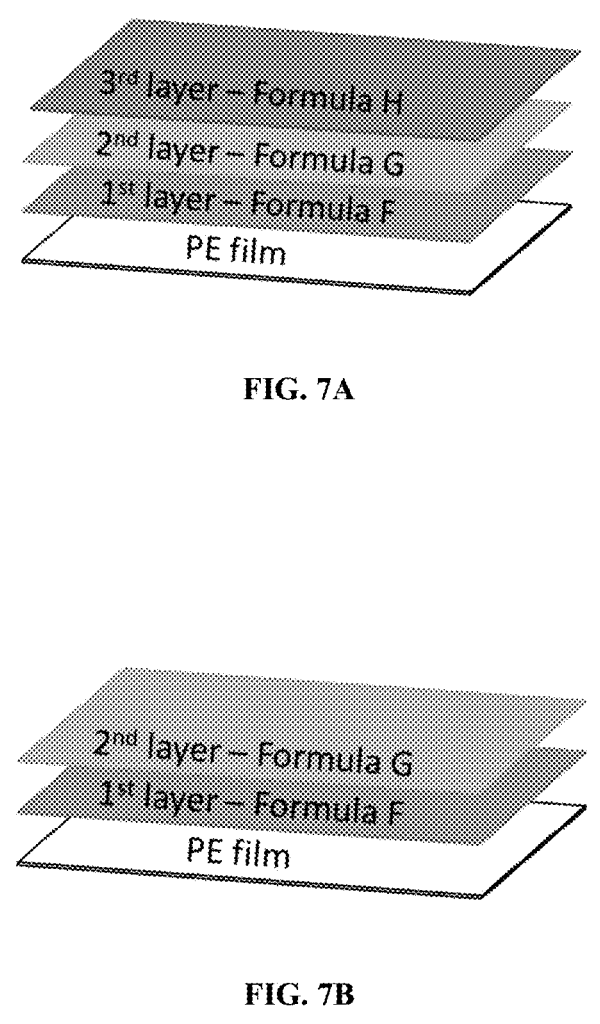

In another aspect, the instant disclosure also provides a composite PE film with three passive cooling coating layers. The first layer was prepared by Formulation F, the second layer was prepared by Formulation G, and the third layer was prepared by Formulation H (FIG. 7A). The composition of Formulation F, Formulation G and Formulation H are listed in Table 5, Table 6 and Table 7, respectively.

For control group, FIG. 7B shows a composite PE film without passive cooling coating layers.

TABLE 6

| Composition of Formulation F | |
| --- | --- |
| Components | Percentage (weight %) |
| PUD-1591 | 3.33% |
| Water | 56.67% |
| TIO-WPR010 | 30.00% |
| J1703 | 10.00% |

In Table 6, PUD-1591 serves as a binder; TIO-WPR010 serves as a metal oxide; and J1703 serves as a wetting agent.

TABLE 7

| Composition of Formulation G | |
| --- | --- |
| Components | Percentage (weight %) |
| PUD-1591 | 44.81% |
| ATO-WP030 | 44.81% |
| J1703 | 9.43% |
| BYK-346 | 0.94% |

In Table 7, PUD-1591 serves as a binder, ATO-WP30 serves as a metal oxide with infrared absorption property; J1703 serves as a wetting agent; and BYK-346, a commercial wetting agent, serves as another wetting agent.

TABLE 8

| Composition of Formulation H | |
| --- | --- |
| Components | Percentage (weight %) |
| PUD-1591 | 19.19% |
| Water | 37.15% |
| Sodium hexametaphosphate | 2.48% |
| Silica spheres | 37.15% |
| J1703 | 4.04% |

In Table 8, PUD-1591 serves as a binder; sodium hexametaphosphate serves as a dispersing agent; silica spheres serve as a metal oxide; and J1703 serves as a wetting agent.

Example 6

Figure 8:
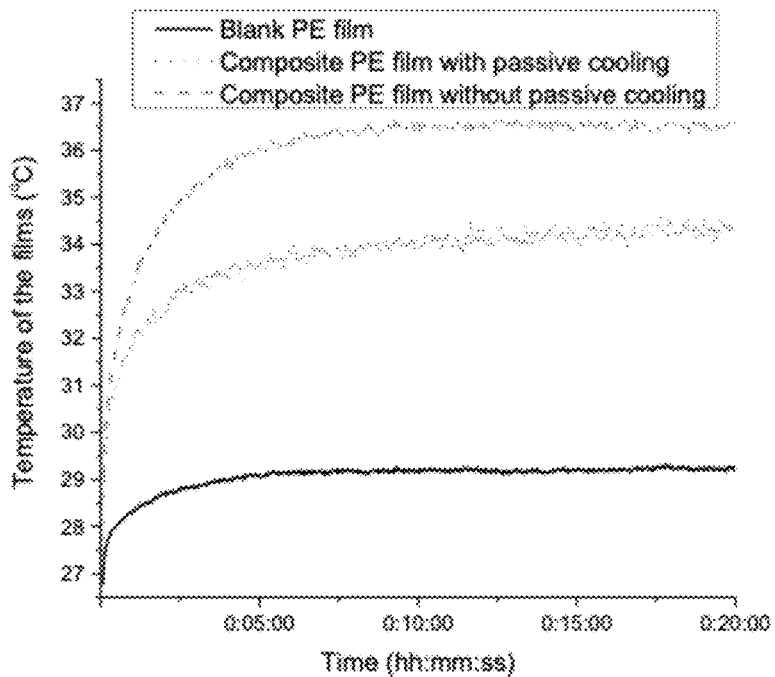
FIG. 8 illustrates the temperatures of the composite PE film with or without passive cooling at different time points.

Referring to FIG. 8, it illustrates that the blank PE film is warmed under the exposure of sunlight. It also shows the coatings are further warmed so that the temperature of the composite PE film without passive cooling (prepared by Formulations F and G, FIG. 7B) is 7° C. higher than the blank PE film. By adding passive cooling components to the coatings, the temperature of the composite PE film (prepared by Formulations F, G and H, FIG. 7A) is cooled down by 2° C. As a result, the passive cooling coating leads to energy loss through light radiation within this range of wavelengths and helps cool down the greenhouse.

Example 7

Figure 9:
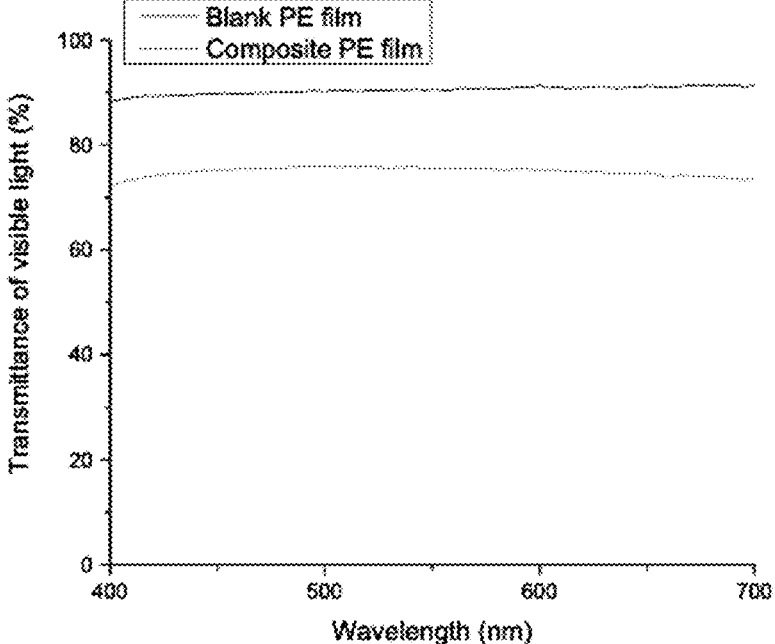
FIG. 9 illustrates the transmittance of visible light through the composite PE film with or without coatings.

FIG. 9 shows that the transmittance of visible light through a blank PE film is around 90%. The coatings only reduce the visible light transmitted through the composite PE film obtained from FIG. 1 by less than 20%. So, more than 70% of visible light is able to pass through the composite PE film.

Example 8

Figure 10:
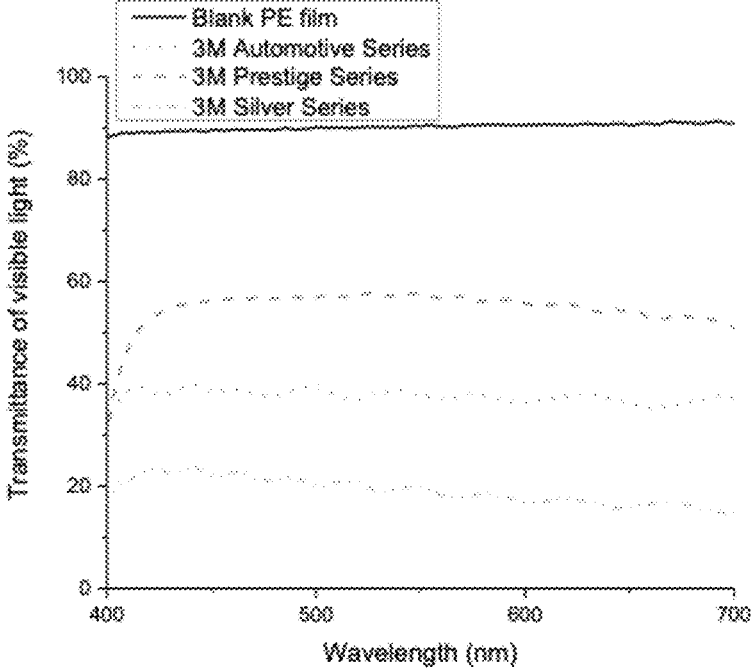
FIG. 10 illustrates the transmittance of visible light through the commercialized polymer films.

FIG. 10 shows that the visible light transmitted through commercial polymer films for thermal management is usually less than 60%. This is significantly less than the visible light transmittance of the composite PE film of the present invention.

Example 9

Figure 11:
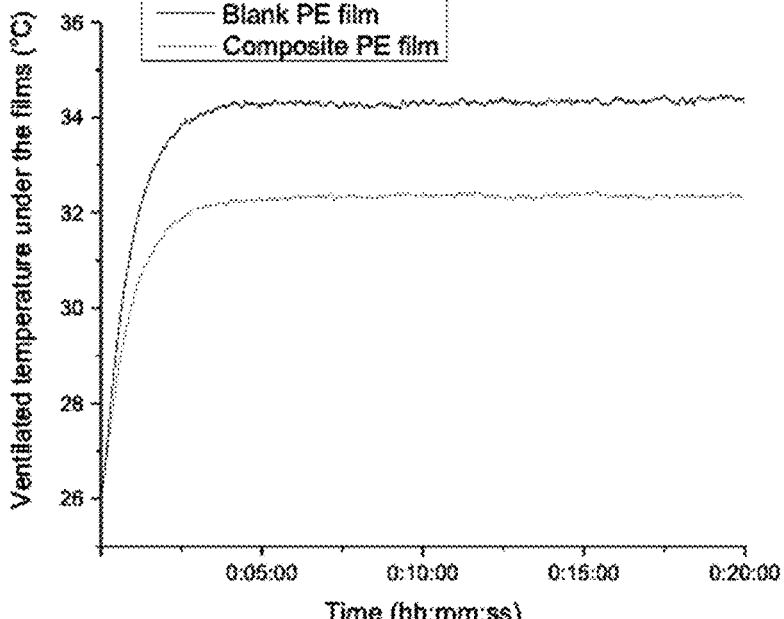
FIG. 11 illustrates the ventilated temperatures under the composite PE film obtained from FIG. 1 at different time points.

In one case, when the air in a region under the composite PE film obtained from FIG. 1 is well ventilated (that is, includes exchange with air outside the greenhouse), the temperature reduction by the composite PE film is 2° C. with reference to blank PE film (FIG. 11).

Figure 12:
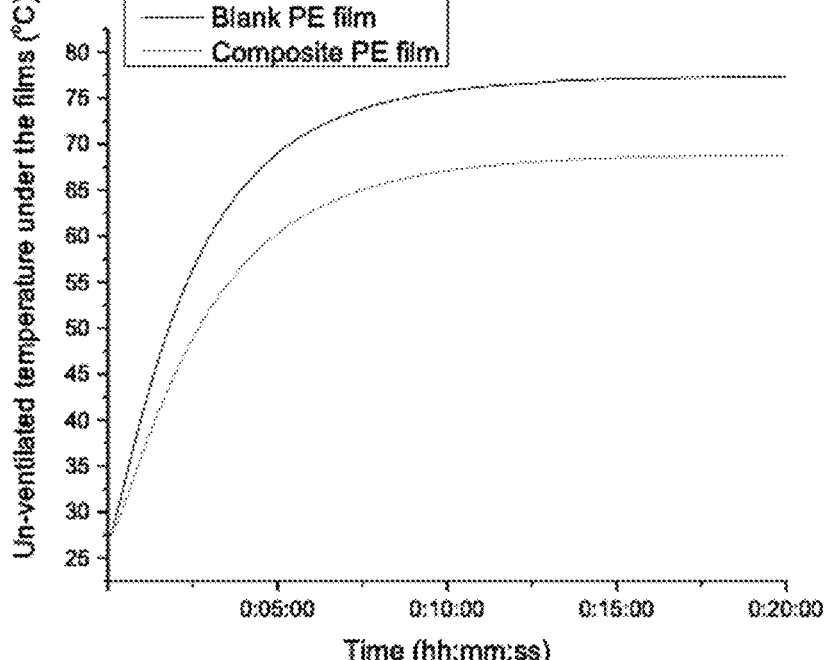
FIG. 12 illustrates the un-ventilated temperatures under the composite PE film obtained from FIG. 1 at different time points.

Under the circumstance that the air under the composite PE film obtained from FIG. 1 is insulated, the temperature reduction by the composite PE film can be at least 8° C. with reference to blank PE film (FIG. 12). So, the cooling effect of the composite PE film in the present invention can help stabilize the air temperature inside the greenhouse and reduce the energy consumption of the cooling system for the greenhouse.

Example 10

Figure 13:
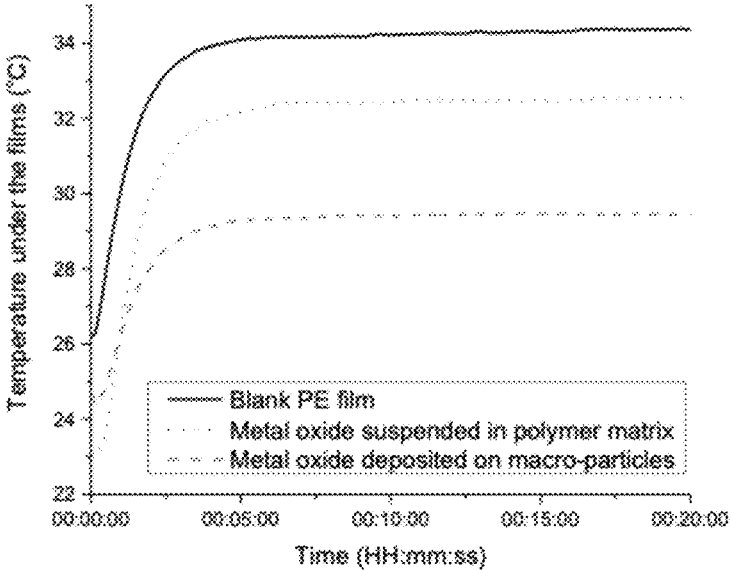
FIG. 13 illustrates the temperatures under the blank PE film, the PE film with metal oxide suspended in polymer matrix, or the PE film with metal oxide deposited on macro-particles at different time points.

Referring to FIG. 13, the coating with deposition of metal oxide on macro-particles obtained from FIG. 2A shows significant cooling effect on the air (4-5° C.) under the film, compared to the coating with random suspension of metal oxide in polymer matrix obtained from FIG. 2B.

Example 11

Figure 14:
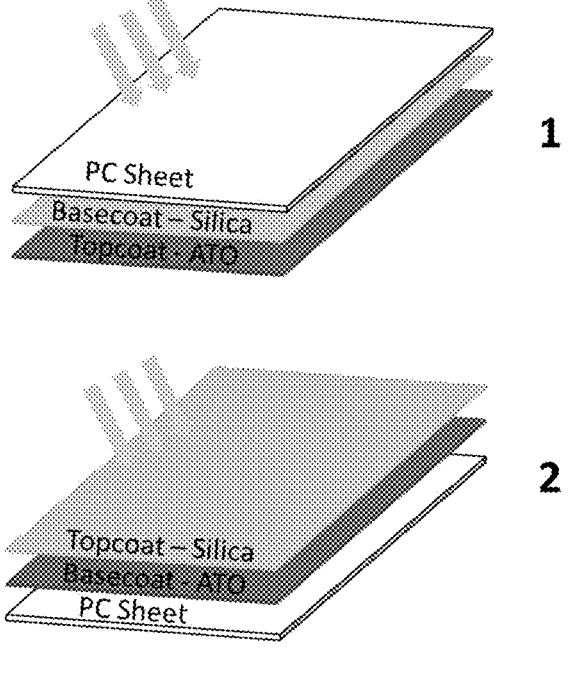
FIG. 14 depicts two different arrangements between the ATO and silica coatings and the substrate.
Figure 15:
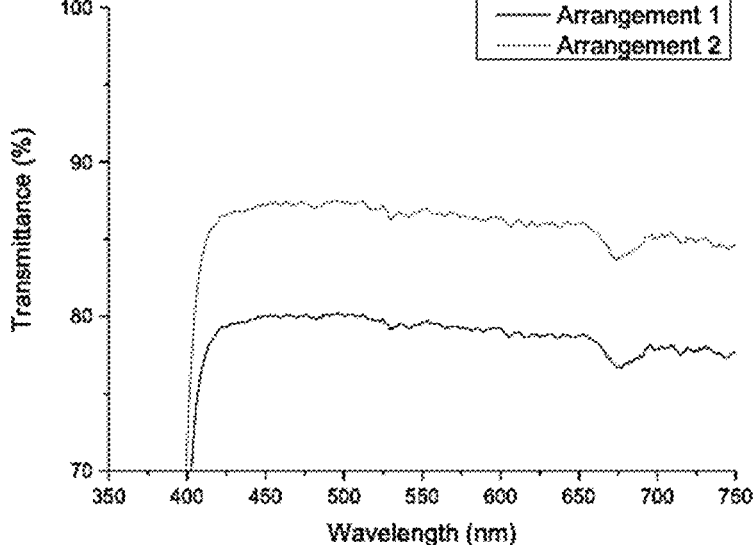
FIG. 15 illustrates the transmittance of visible light through the two different arrangements shown in FIG. 14.

In one case, when using a reflective polymer (e.g., polycarbonate) as the substrate window, the layer arrangement may give significant difference in the visible light transmittance. As shown in FIG. 14 and FIG. 15, arrangement 2 is found to have higher transmittance in the visible light region compared to that of arrangement 1. This phenomenon is probably due to the light scattering effect and internal reflection of silica particles. In arrangement 1, some of the light would be already reflected by the polycarbonate since the polycarbonate is used as the top layer against the light source, resulting in lower visible light transparency. On the other hand, in arrangement 2, the silica particle of the top layer can converge more light by scattering effect. Furthermore, the "reflected light" reflected from the bottom polycarbonate substrate can also be converged back by the silica particles. Such scattering effect and internal reflection of silica particles can greatly enhance the visible light transmittance.

Example 12

FIG. 16 and FIG. 17 show the visible light transmittance spectra of two control samples without an ATO coating and silica coating on the polycarbonate substrate. As shown in the spectra, there is no significant difference in terms of visible light transmittance when the polycarbonate film is directly facing to the light source or not. These results further suggest the impact of layer arrangement and silica particles on the visible light transmittance.

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

What is claimed is:

1. A window assembly for a building structure comprising a building structure window and optically transparent and self-cooling coatings, wherein the optically transparent and self-cooling coatings comprise a multi-layered structure comprising:
 a passive cooling layer; and
 a near-infrared radiation absorption layer;
 wherein the layers being disposed on the building structure window;
 wherein the optically transparent and self-cooling coatings together have a visible light transmittance of more than approximately 70%;
 wherein, under a ventilated condition in which air beneath the building structure window is exchanged with outdoor air, the air temperature beneath the building structure window is reduced by at least approximately 2° C.;
 wherein, under an insulated condition in which the air beneath the building structure window is isolated from the outdoor air, the air temperature beneath the window is reduced by at least approximately 8° C.; and
 wherein the passive cooling layer comprises:
 approximately 20-45 wt % of metal oxide;
 approximately 3.0-55 wt % of binder;
 approximately 1.0-5.0 wt % of dispersing agent;
 approximately 5.0-10 wt % of wetting agent; and
 approximately 10-50 wt % of water.

2. The window assembly of claim 1, wherein the metal oxide comprises silicon oxide, silicon nitride, silicon carbide or a material with IR emissivity property at 8-13 μm.

3. The window assembly of claim 2, wherein a particle size of the metal oxide is in a range of approximately 1 to 15 μm.

4. The window assembly of claim 1, wherein the dispersing agent is a low molecular weight dispersant selected from hexametaphosphate, triphosphate, pyrophosphate, citrate, tartrate and succinate with ammonium cations, group 1A or group 2A metallic cations.

5. The window assembly of claim 1, wherein the near-infrared radiation absorption layer comprises:
 approximately 40-50 wt % of metal oxide;
 approximately 20-40 wt % of binder;
 approximately 0.5-3.0 wt % of dispersing agent;
 approximately 7.0-15 wt % of wetting agent; and
 approximately 5-15 wt % of water.

6. The window assembly of claim 5, wherein the metal oxide comprises antimony doped tin oxide, indium tin oxide, transition metal oxides, post-transition metal oxides, metalloids oxides having near infrared absorption property and high transparency at visible light region, wherein the antimony doped tin oxide has a particle size in a range of approximately 20-400 nm.

7. The window assembly of claim 5, wherein the dispersing agent is a low molecular weight dispersant selected from hexametaphosphate, triphosphate, pyrophosphate, citrate, tartrate and succinate with ammonium cations, group 1A or group 2A metallic cations.

8. The window assembly of claim 1, further comprising a near-infrared radiation reflecting layer comprising:
 approximately 1.0-5.0 wt % of binder;
 approximately 20-40 wt % of metal oxide;
 approximately 2.0-7.0 wt % of wetting agent; and
 approximately 50-70 wt % of water.

9. The window assembly of claim 8, wherein the metal oxide comprises zinc oxide, aluminum oxide, or other transition metal oxides, post-transition metal oxides, metalloids oxides with near infrared absorption property and having high transparency at visible light region.

10. The window assembly of claim 1, wherein the window comprises glass, polyolefins, polyethylene film, polycarbonate, poly(methyl methacrylate), or polyvinyl chloride.

11. A greenhouse comprising the window assembly of claim 1.

* * * * *